No. 757,860. PATENTED APR. 19, 1904.
C. CANCLINI.
ORE CAR.
APPLICATION FILED OCT. 5, 1903.
NO MODEL. 2 SHEETS—SHEET 1.
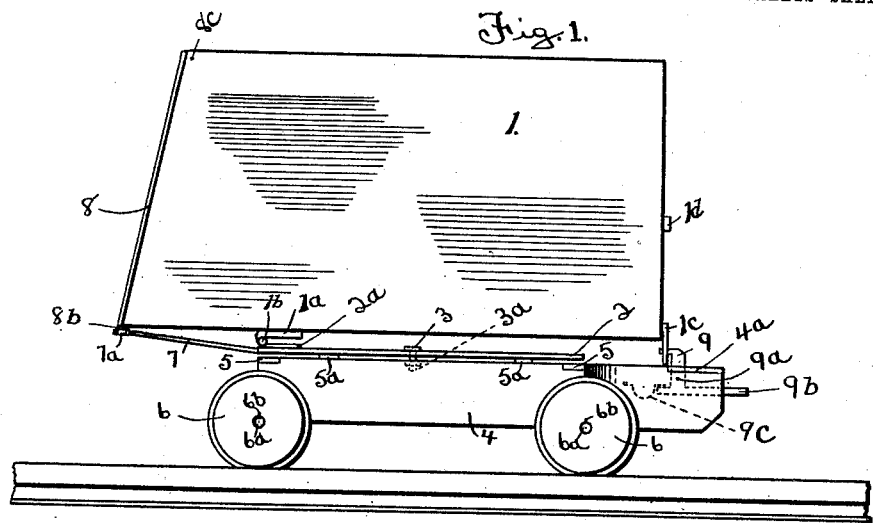
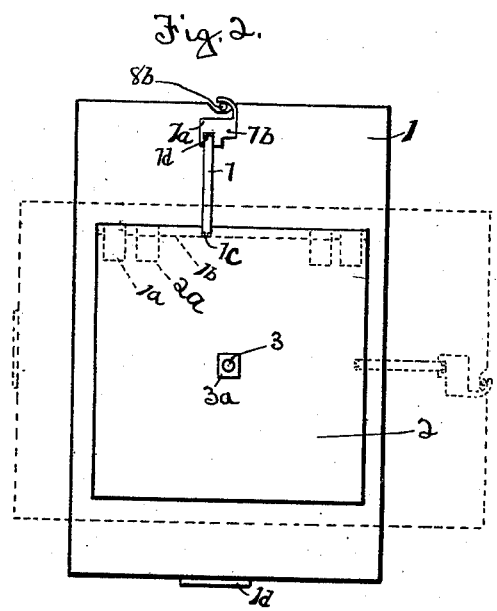
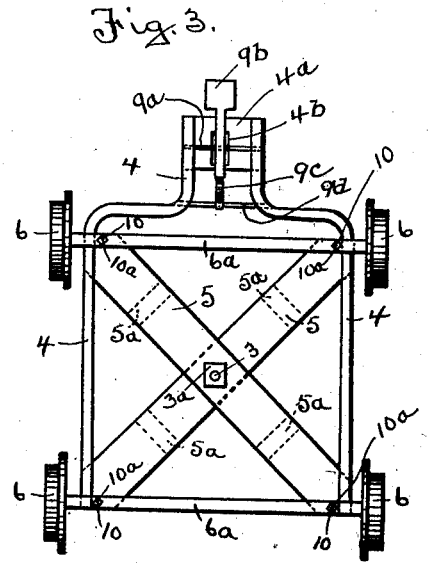
Witnesses
Percy S. Webster.
Stella Anderson.
Inventor
Charles Canclini
By Joshua B. Webster
Attorney No. 757,860. PATENTED APR. 19, 1904.
C. CANCLINI.
ORE CAR.
APPLICATION FILED OCT. 5, 1903.
NO MODEL. 2 SHEETS—SHEET 2.
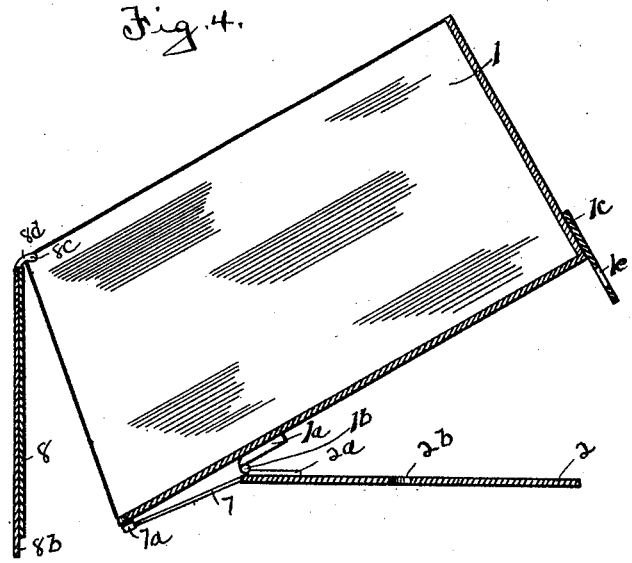
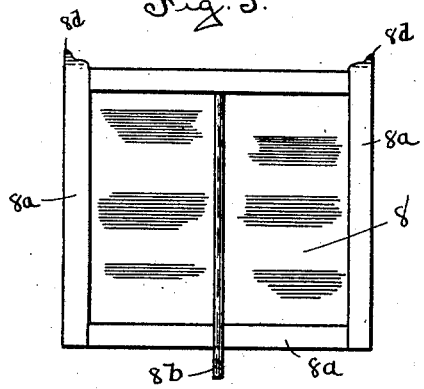
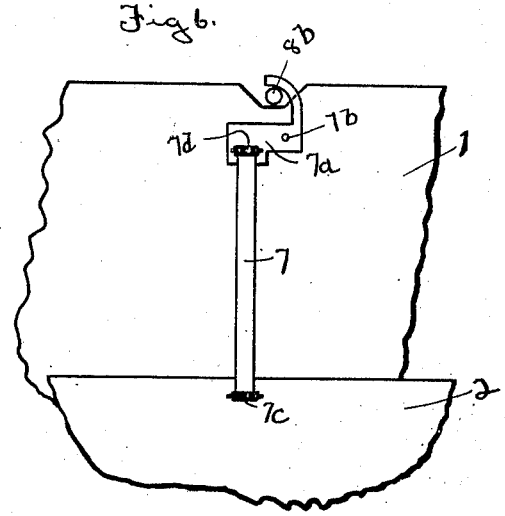
Witnesses
Percy S. Webster.
Stella Anderson.
Inventor
Charles Canclini
By Joshua B. Webster
Attorney No. 757,860.  
Patented April 19, 1904.

UNITED STATES PATENT OFFICE.

CHARLES CANCLINI, OF STOCKTON, CALIFORNIA.

ORE-CAR.

SPECIFICATION forming part of Letters Patent No. 757,860, dated April 19, 1904.

Application filed October 5, 1903. Serial No. 175,908. (No model.)

*To all whom it may concern:*

Be it known that I, CHARLES CANCLINI, a resident of Stockton, in the county of San Joaquin and State of California, have invented certain new and useful Improvements in Ore-Cars, of which the following is a specification.

My invention relates to new and useful improvements in ore-cars, and especially to those used in mining and the like for transporting the material excavated and dumping it at the desired place; and its object is to provide an improved truck-frame which will be comparatively simple and inexpensive and light in weight, yet exceedingly durable; and a further object of my invention is to provide a simple turn-table by means of which the car-box may be turned at any point desirable for dumping.

Still another object is to provide an improved automatic opener for the car door or gate.

My invention also consists of further improved details, which will be hereinafter pointed out.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of my improved ore-car. Fig. 2 is a bottom plan view of the car bed and platform detached from the truck. Fig. 3 is a bottom plan view of the truck with the car box and platform detached. Fig. 4 is a side elevation of the car box and platform in section detached from the truck and showing the car-box partly tipped from the platform. Fig. 5 is a front view of car door or gate. Fig. 6 is a bottom plan view of the car bed and platform, showing my improved automatic device for opening the car-door.

1 is the car-box.

$1^a$ is a strap of suitable material connecting the car-box to axle $1^b$.

$1^b$ is an axle with which the box 1 is connected and on which it turns when tilted.

$1^c$ is a slotted projection at the front of the box 1, projecting downward for the purpose of engaging with a hook 9, hereinafter described.

$1^d$ is a handle on the front end of the car.

$1^e$ is a slot in said projecting portion $1^c$.

2 is a rotating platform to which the box 1 is connected by means of the strap $1^a$, the axle $1^b$, and the strap $2^a$.

$2^a$ is a strap of suitable material connecting with the axle $1^b$.

3 is the bolt by which the platform 2 is connected to the truck of the car at the center point of the intersection of two braces 5, hereinafter described, and is used for an axle on which the platform 2 rotates. $3^a$ is the nut to same.

4 represents the sides of truck fastened to the axles by means of bolts $10^a$ and nuts 10, the bolts $10^a$ passing through suitably-arranged slots on the inside of said sides. These sides are curved to form a nose or beak at the front end of the car. $4^a$ is a slotted platform on said nose, on which the operator may ride. $4^b$ is the slot in the said platform $4^a$, through which a hook 9, hereinafter described, projects.

5 represents braces connecting the sides 4 and whose ends are embedded in said sides and bolted thereto.

$5^a$ represents upward projections upon the braces 5 at equal distances from the corners of the ends thereof which support the platform 2, so that it will not sag and catch on the corners of the truck.

6 represents the wheels of the truck. $6^a$ represents the axles of same. $6^b$ represents oil-caps for said axles $6^a$.

7 is a link connecting the platform 2 with a catch $7^a$.

$7^a$ is a catch engaging with the bar $8^b$.

$7^b$ is a pin or axle upon which the catch $7^a$ rotates.

$7^c$ is a hinge connecting the link 7 to the platform 2.

$7^d$ is a hinge connecting the link 7 with the catch $7^a$.

8 is the door or gate of the car-box.

8$^a$ represents straps of suitable material and width placed around the front end of the door of the car-box at the edges.

8$^b$ is a bar fastened to the outside of the door or gate 8 and projecting a little from the bottom thereof, with which the catch 7$^a$ engages.

8$^c$ represents pins connecting the door 8 to the sides of the car-box in a manner as will be shown.

8$^d$ represents continuations of the straps 8$^a$ on the sides of the door of the car-box, forming, with the pins 8$^c$, hinges.

9 is a hook adapted to engage with the slot 1$^e$. 9$^a$ is a pin connecting said hook to the sides 4 at the front end.

9$^b$ is a lever acting on pin 9$^a$ and regulated by spring 9$^c$, which lever operates the hook 9, of which it is a component part.

9$^c$ is a spring regulating the lever 9$^a$.

9$^d$ is a pin for the purpose of securing the spring 9$^c$ in position.

10 represents nuts screwed onto the bolts 10$^a$, which pass through suitable slots in the braces 5 and on the inside of the sides 4 and through the axles 6$^a$, holding them firmly connected.

The mode of operating my improved ore-car is as follows: The car-box 1, held parallel to the truck or running-gear by means of the hook 9 and spring 9$^c$, is filled with the ore or other material and transported to the place desired for dumping the same. The operator then disconnects the hook 9 from the slot 1$^e$ by pressing down the lever 9$^b$. The car-box 1 and platform 2 and their parts may then be slued around to the desired point at which to dump the contents of the car, as shown by dotted lines in Fig. 2. The operator then grasps the handle 1$^d$ and tilts the car-box backward on the hinge 1$^a$ 1$^b$ 2$^a$, as shown in Fig. 4. As the car-box is tilted the link 7, connected to the platform 2, which does not tilt, by the hinge 7$^c$, acting on the hinges 7$^c$ and 7$^d$, forces the catch 7$^a$ to turn on the pin 7$^b$ and disconnect from the bar 8$^b$. The door or gate 8 being then released swings open on the hinges 8$^c$ 8$^d$ and allows the ore in the car to slide out. The car-box 1 is then tilted back and the door swings shut, and the link 7 causes the catch 7$^a$ to reverse its former movement and again catch the bar 8$^b$, and the car is ready for the reception of more material.

It can be readily seen that by use of the side pieces 4 and their braces 5 I do away with the cumbersome and heavy truck-frames now in use and still have one which is durable and easily operated.

Another feature of my invention which I wish to particularly point out is my improved turn-table, the simplicity and efficiency of which can be easily comprehended.

The platform 2 is square-shaped, as is also the truck-frame, and by this construction the equilibrium of the car is preserved no matter in what direction the box is slued around.

The axle 6$^a$ may be provided with oil-cups 6$^b$.

The back of the car-box 1 is slanted at a small angle toward the front end, so that the gate 8 may have more swing and so that the material dumped may have more impetus.

Various changes in the form and details of my invention may be resorted to at will without departing from the spirit of my invention or limiting the scope thereof. Hence I consider myself entitled to all forms of the invention as may lie within the intent of my claims.

Having thus described my invention, what I claim as new and useful, and desire to secure by Letters Patent, is—

1. In an ore-car the combination with suitable truck wheels and axles, of the side pieces 4, the braces 5 provided with the vertical projections 5$^a$ adapted to prevent the car-box from sagging, said side pieces 4 and braces 5 connected to the axles by means of bolts 10$^a$ and nuts 10 in the manner described, the side pieces 4 curved to form a nose at the front end thereof, a slotted platform 4$^a$ on said nose, a turning platform 2 acting on the bolt 3, and resting on the vertical projections 5$^a$, said platform being connected to the braces 5 by means of the bolt 3, hinges 2$^a$, 1$^b$, 1$^a$, connecting said platform to a car-box 1, said car-box provided with a door or gate 8, said door or gate being provided with straps of suitable material 8$^a$, the curved portions 8$^d$ thereof forming, with the pins 8$^c$, hinges, said door 8 working on said hinges, a bar 8$^b$ suitably fastened on the door 8 and projecting downward beyond the bottom of said gate, a catch 7$^a$ adapted to engage with said bar, a link 7 connected to the catch 7$^a$ by a hinge 7$^d$ and to a platform 2 by a hinge 7$^c$, a hook 9 projecting upwardly through a slot 4$^b$ in the platform 4$^a$, a lever 9$^b$ forming a component part of said hook, and adapted to be used to operate said hook, and a spring 9$^c$ regulating said hook and lever, a downward projection 1$^c$ on the front of the car 1, a slot 1$^e$ therein adapted to receive the hook 9 and a handle 1$^d$ suitably arranged on the front of the car-box 1 all substantially as described.

2. In an ore-car of the kind described the combination with a car-box 1 and an adjoined rotating platform 2, of a link 7 connected to the platform, a hinge 7$^c$, a hinge 7$^d$, said hinges adapted to connect the link 7 to the platform 2 and a catch 7$^a$ respectively, a catch 7$^a$, a pin 7$^d$ and a bar 8$^b$ suitably fastened on a box door or gate 8, said bar adapted to engage with and be held by the catch 7$^a$, all substantially as set forth.

3. An ore-car comprising with suitable truck wheels and axles, the combination of a car-box 1 provided with a suitable handle 1$^d$ and a downwardly-projecting lip 1$^c$ provided with a slot $1^e$, said car-box also having a door or gate 8 provided with straps $8^a$ and the curved portions $8^d$ thereof with pins $8^c$ forming hinges, the bar $8^b$ suitably attached to the door 8, a platform 2 suitably hinged to the car-box 1 and acting on a bolt 3, a catch $7^a$ suitably attached to the car-box 1 by means of a pin $7^b$, a hinge $7^d$, a link 7, a hinge $7^c$, said catch $7^a$ attached to the platform 2 by means of said link 7 and hinges $7^c$ and $7^d$, side pieces 4 provided with intersecting braces 5, said side pieces 4 and braces 5 connected to axles $6^a$ by means of bolts $10^a$ and nuts 10, the platform 2 connected to the braces 5 at the point of intersection by means of a bolt 3 and a nut $3^a$, a slotted platform $4^a$ on the nose formed by the side pieces 4, a slot $4^b$ therein, a hook 9 projecting through the slot $4^b$ and adapted to engage with the slot $1^e$, a lever $9^b$ forming a component part of and adapted to regulate the motion of the hook 9, and a spring $9^c$ adapted to regulate said hook and lever, said hook, lever and spring suitably fastened within the nose formed by the side pieces 4, and upward projections $5^a$ on the braces 5 adapted to support the platform 2 and prevent it from sagging, all substantially as described.

4. An ore-car comprising the combination with suitable truck wheels and axles of the side pieces 4, the braces 5, the bolts 10 and nuts $10^a$ adapted to fasten the side pieces 4 and braces 5 to the truck-axles, a platform 2 attached to the braces 5 by means of a bolt 3 and nut $3^a$, said platform adapted to rotate on said bolt 3, a car-box 1 suitably attached to the platform 2 by means of hinges $2^a$, $1^b$, $1^a$, box door or gate 8 provided with straps $8^a$, two of said straps suitably curved over and adapted to form, with the pins $8^c$, hinges, a bar $8^b$ attached to and projecting down from the door or gate 8, a catch $7^a$ attached to the bottom of the car-box 1 by means of and rotating on a pin $7^b$, said catch adapted to engage with and hold the bar $8^b$, a link 7, a hinge $7^d$ adapted to connect the link 7 to the catch $7^a$, a hinge $7^c$ adapted to connect the link 7 to the platform 2, a downward-projecting lip on the front of the car-box 1, a slot $1^e$ in said lip, a hook 9 adapted to engage with said slot, a lever $9^b$ adapted to regulate the action of said hook and a spring $9^c$ adapted to regulate said hook and lever, a pin or axle $9^a$ on which said hook and lever act and a pin $9^d$ adapted to hold the spring $9^c$ in position, and a slotted platform $4^a$ suitably arranged on the side pieces 4 all substantially as described.

5. An improved ore-car comprising a combination with suitable truck wheels and axles, of the side pieces 4, intersecting braces 5, upward projections $5^a$ thereon, said side pieces 4 curved to form a nose at the front end of the car, said side pieces and intersecting braces suitably attached to the axles, a slotted platform $4^a$ on the nose formed by the side pieces 4, a slot $4^b$ therein, a hook 9 fastened in the said nose by means of a pin or axle $9^a$, said hook 9 projecting through the slot $4^b$, a lever $9^b$ forming a component part of the hook 9, a spring $9^c$ suitably attached within the nose formed by the side pieces 4 and adapted to regulate the action of the said lever and hook, a platform 2 attached to the braces 5 at the point of intersection by means of a bolt 3 and nut $3^a$, said platform adapted to revolve on said bolt 3 and to rest on the projections $5^a$, a car-box 1 suitably hinged to said platform 2, said box 1 being provided with a handle $1^d$ and having a downward-projecting lip $1^c$ provided with a slot $1^e$, said slot $1^e$ adapted to engage with the hook 9, a door or gate 8 suitably attached to the car-box 1 and provided with side straps $8^a$ and a bar $8^b$, said bar projecting a little downward from said door, a catch $7^a$ adapted to engage with and hold securely said bar $8^b$, said catch connected to the platform 2 by means of a link 7 and hinges $7^c$ and $7^d$, all substantially as described.

6. In an improved ore-car the combination of suitable truck wheels and axles, side pieces attached thereto and curved to form a nose at the front end of said car, braces for said side pieces, upward projections on said braces, a suitable revolving platform attached to the braces and resting on the projections thereon, a hook fastened in the nose formed by the side pieces and regulated by a suitable lever and spring, a platform on said nose, a slot therein for the reception of said hook, a car-box hinged to the platform 2 and provided with a slotted downward lip on its front, a slot in said projection adapted to engage with the said hook, a handle on said car-box, said car-box also being provided with a door or gate, side straps on said gate, said straps bent so as to form, with suitable pins, hinges, a bar suitably attached to said gate and projecting a little downward therefrom, a catch adapted to engage with said bar, said catch fastened to the car-box by means of a suitable pin, said catch being also adapted to rotate on said pin, a link connecting the said catch to the said rotating platform by means of suitable hinges, all substantially as set forth.

7. The combination in an improved ore-car of suitable wheels and axles, side pieces 4, intersecting braces 5, projections $5^a$ thereon, said side pieces and braces fastened to the axles, a rotating platform 2 suitably attached to said braces, car-box 1 hinged to said platform and provided with a catch $7^a$, said catch rotating on a pin $7^b$ and attached to the car-box by means of said pin, a link 7, hinges $7^c$ and $7^d$, a gate or door 8, straps $8^a$, pins $8^c$, a bar $8^b$ adapted to engage with the catch $7^a$, a nose formed at the front end of the car by curving the side pieces 4, a hook 9, a lever $9^b$ and a spring $9^c$ all fastened in said nose, a platform $4^a$ provided with a slot $4^b$, a lip $1^c$ provided with a slot 1ᵉ adapted to engage with the hook 9 and a handle 1ᵈ substantially as set forth.

8. The improved ore-car having a car-box 1 attached to a platform 2, said platform 2 rotating on the bolt 3 and attached to braces 5 by means of said bolt, projections 5ᵃ, side pieces 4, said braces and side pieces attached to axles 6ᵃ, wheels 6, a hook 9 adapted to engage with slot 1ᵉ, said slot suitably arranged in a lip on the front of car-box 1, the lever 9ᵇ forming a component part of the hook 9 and a spring 9ᶜ regulating said hook and lever, said hook, lever and spring suitably attached to the side pieces 4, said car-box 1 being provided with a handle 1ᵈ and a suitable door or gate 8, and a means for automatically locking and unlocking said door or gate all substantially as set forth.

In testimony whereof I affix my signature in the presence of two witnesses.

CHARLES CANCLINI.

Witnesses:
  PERCY S. WEBSTER,
  G. GHIGLIERI.